(12) United States Patent
Leimala

(10) Patent No.: US 8,357,227 B2
(45) Date of Patent: Jan. 22, 2013

(54) METHOD FOR THE PURIFICATION OF COPPER CHLORIDE SOLUTION

(75) Inventor: Raimo Leimala, Pori (FI)

(73) Assignee: Outotec Oyj, Espoo (FI)

( * ) Notice: Subject to any disclaimer, the term of this patent is extended or adjusted under 35 U.S.C. 154(b) by 1410 days.

(21) Appl. No.: 10/511,290

(22) PCT Filed: Apr. 15, 2003

(86) PCT No.: PCT/FI03/00292
§ 371 (c)(1),
(2), (4) Date: Oct. 14, 2004

(87) PCT Pub. No.: WO03/089675
PCT Pub. Date: Oct. 30, 2003

(65) Prior Publication Data
US 2005/0145073 A1    Jul. 7, 2005

(30) Foreign Application Priority Data
Apr. 19, 2002   (FI) .................................... 20020749

(51) Int. Cl.
*C22B 15/00*   (2006.01)
(52) U.S. Cl. .......................................... 75/740; 502/401

(58) Field of Classification Search ............ 75/740; 502/401
See application file for complete search history.

(56) References Cited

U.S. PATENT DOCUMENTS

| | | | |
|---|---|---|---|
| 3,873,668 A | 3/1975 | Melby | 423/24 |
| 3,951,649 A | 4/1976 | Kieswetter, Jr. et al. | 75/117 |
| 4,297,183 A | 10/1981 | Georgeaux | 204/117 |
| 5,478,819 A * | 12/1995 | Tarpila et al. | 514/192 |
| RE36,118 E * | 3/1999 | Cupertino et al. | 75/710 |
| 6,007,600 A | 12/1999 | Hyvarinen et al. | 75/740 |
| 6,165,367 A * | 12/2000 | Partridge | 210/670 |

OTHER PUBLICATIONS

Kekesi, Tamas et al "Preparation of Ultra-High-Purity Copper by Anion Exchange"; *Metallurgical and Materials Transactions B*, vol. 28B, No. 987, Dec. 1997.
Koivula, Risto et al; "Purification of Metal Plating Rinse Waters with Chelating Ion Exchangers" *Hydrometallurgy*, vol. 56, p. 107, 2000.

* cited by examiner

*Primary Examiner* — Jie Yang
(74) *Attorney, Agent, or Firm* — Buchanan Ingersoll & Rooney PC

(57) ABSTRACT

The invention relates to a method for the removal of metal impurities in chloride-based copper recovery processes. The amount of impurities in a strong chloride solution of monovalent copper can be reduced according to the method down to very low levels by using ion exchange as at least one purification stage.

4 Claims, No Drawings

METHOD FOR THE PURIFICATION OF COPPER CHLORIDE SOLUTION

The invention relates to a method for the removal of metal impurities in a chloride-based copper recovery process. According to this method, the amount of metal impurities in a strong chloride solution of monovalent copper can be reduced to very low levels by using ion exchange as at least one purification stage, especially chelating ion-exchange resins.

U.S. Pat. No. 6,007,600 describes a method for the hydrometallurgical production of copper from copper-containing raw materials such as copper sulphide concentrate. According to the method the raw material is leached counter-currently with a strong sodium chloride-copper chloride solution in several stages to form a monovalent copper(I) chloride solution. Since both some divalent copper chloride and impurities composed of other metals always remain in the solution, reduction of the divalent copper and solution purification are performed. The pure cuprous chloride solution is precipitated with sodium hydroxide to copper oxidule (cuprous oxide) and the oxidule is reduced further to elemental copper. The sodium chloride solution generated during copper oxidule precipitation is treated further in chlorine-alkali electrolysis, and the chlorine gas and/or chloride solution obtained from this is used in raw material leaching, the sodium hydroxide formed in electrolysis for oxidule precipitation and the forming hydrogen for the reduction of copper to elemental copper. U.S. Pat. No. 6,007,600 focuses on the copper recovery method as a whole, but solution purification for example is not described in detail.

U.S. Pat. No. 5,487,819 also describes a method for the hydrometallurgical production of copper from a copper-containing raw material such as copper sulphide concentrate. According to the method, the raw material is leached counter-currently with a sodium chloride-copper chloride solution in several stages in order to form a monovalent copper(I) chloride solution. The solution generated is subjected to ordinary solution purification as hydroxide precipitation, described in example 6. Zinc and lead contents in the cuprous chloride solution after solution purification are at a level of 2-3 g/l, and the solution is fed to copper electrolysis.

When one wishes to reduce the impurity level of a copper chloride solution as much as possible, for instance down to a few mg/l or less, ordinary hydroxide precipitation is not sufficient to reach this level, without a great deal of copper being precipitated together with impurities. It is of course clear that it is worth precipitating the majority of metal impurities by normal methods, but the final purification has been problematic, since for instance the permitted impurity content of LME-A level cathode copper is rather small (BS 6017:1981).

In the types of processes described above the original material i.e. copper concentrate is leached into a strong alkali chloride solution, containing for example at least 200 g/l NaCl or other alkali chloride. Copper and metal impurities are then present in the solution as chloride complexes, usually with a negative charge. Copper is mainly present in the solution in mono-valent form.

In their article: "Ultra high purification of copper chloride solutions by anion exchange", Hydrometallurgy 45 (1997), pp. 345-361, Kekesi, T. and Isshiki, M. suggested anion-exchange resins for the purification of a copper chloride solution. The disadvantage is however, that it requires a large quantity of resin, multi-stage washing to remove metal impurities from the resin, and a separate stage for the separation of lead for example.

Chelating ion exchangers have been researched for the removal of base metals such as zinc, cadmium, copper and nickel from metal plating solutions. One study is described in the article by Koivula, R. et al: "Purification of metal plating rinse waters with chelating ion exchangers", Hydrometallurgy 56 (2000) pp. 93-108. The chloride contents of the solutions were however in the range of some milligrams per litre.

U.S. Pat. No. 4,895,905 describes a method for the removal of alkali earth or heavy metals from a strong NaCl solution using chelating resins. The amount of alkali earth and heavy metals before resin treatment was at the most about one hundred mg/l and after treatment the majority of metals were undetectable. The patent concentrates largely on resins where the functional group is alkylaminophosphonic.

The method of the invention relates to the removal of metal impurities from a strong chloride solution of monovalent copper to the level where the amount of metal impurities is only a few milligrams per litre. The removal of metal impurities is implemented at least partly using ion exchange, in particular with chelating ion-exchange resins. The term strong chloride solution refers to a solution where the amount of alkali chloride such as sodium chloride is at least 200 g/l. The amount of copper, especially monovalent copper, in the solution is in the order of 30-100 g/l. Particularly in processes where the final product, metallic copper, is formed by precipitation, the amount of metal impurities should be reduced in the solution from which the precipitation is to occur, since the impurities will be precipitated alongside the copper in the precipitation stage.

The essential features of the invention will be made apparent in the attached claims.

If divalent copper is present in the monovalent copper chloride solution, it is first removed by some appropriate method. The principal metal impurities in copper concentrate are zinc, lead, nickel, iron and manganese, and they appear in a chloride solution in divalent or trivalent form. The majority of unwanted divalent metals can most advantageously be removed using conventional precipitation methods such as hydroxide precipitation.

Precipitation can however be carried out in connection with the method according to the present invention so that 0.1-1 g/l of metal impurities are left in the solution. This avoids the precipitation of copper along with other metals, which would cause fruitless recirculation and copper losses.

The removal of metal impurities from a copper chloride solution down to a level of a few milligrams is performed using a chelating ion-exchange resin. The functional group of ion-exchange resin is preferably the iminodiacetic acid group or the aminophosphonic group ($-CH_2-NH-CH_2-PO_3Na_2$). The property they have in common is a styrene-divinyl-benzene matrix of ring structure and a certain functional group that is selective for certain metals. A divalent or trivalent metal, such as zinc, lead, nickel, iron and manganese, can be bound to the functional group in place of the sodium. Since the resin does not bind monovalent copper so strongly, it remains in the chloride solution and passes through the resin. The metals bound to the resin are eluted with hydrochloric acid and the solution obtained is returned to the process so that the metal impurities are finally removed from the process via the precipitation stage.

Since the resin used binds divalent copper about as strongly as it binds the metal impurities, the oxidizing effect of the air must be eliminated so that the monovalent copper is not oxidized into divalent.

The dissolution of monovalent copper into water is based on chloride complexes so that the solution is stable only in a strong chloride solution, an acidic or neutral environment. Therefore the process solution that is the mother liquor in the resin (monovalent copper chloride solution) has to be displaced with an NaCl solution before elution, and correspondingly before the process solution is fed into the resin after regeneration, the equipment that contains resin must be filled with an NaCl solution instead of the alkaline regeneration solution.

We have found that by using the above ion-exchange resin for the purification of monovalent copper chloride solution it is possible to achieve an impurity level in the solution that corresponds to cathode copper grade LME-A or even purer.

The method is described further by the following examples.

EXAMPLE 1

Tests were carried out in 50 ml burettes. The feed rate of the solution through the column was 300 ml/h. Samples of the outflowing solution were taken every hour. After the test 150 ml of NaCl solution was fed through the column, after which the column was eluted with a 10% HCl solution for three hours at a rate of 100 ml/h. During elution 5 samples were taken. After elution 150 ml of water was fed through the column and finally the resin was regenerated by feeding 300 ml of NaOH solution (NaOH=80 g/l) through the column.

The solution for purification contained about 200 mg/l of lead and zinc, and about 50 mg/l of iron, manganese and nickel, and its pH was 6. The same solution was fed to each of the three columns with separate hose pumps.

Three resins were used in the tests in parallel columns. A summary of their basic characteristics is shown in Table 1.

TABLE 1

Properties of ion-exchange resins used in tests

| | Resin | | |
|---|---|---|---|
| | I | II | III |
| Matrix | Styrene divinylbenzene | Styrene divinylbenzene | Styrene divinylbenzene |
| Functional group | Iminodiacetic | —$CH_2$—NH—$CH_2$—$PO_3Na_2$ | Iminodiacetic |
| Ion form | $Na^+$ | $Na^+$ | $Na^+$ |
| Capacity, eq/l | ≧1.25 | ≧1.0 | ≧1.0 |

TABLE 2

Ion-exchange test results

| TEST | SAMPLE | TIME h/min | Cu g/L | Zn mg/L | Pb mg/L | Fe mg/L | Mn mg/L | Ni mg/L |
|---|---|---|---|---|---|---|---|---|
| Resin I | Charging | Feed solution | 52.8 | 203 | 140 | 49.0 | 37.8 | 36.6 |
| | Charging | 1 h | 52.0 | <0.5 | <1 | 2.9 | <0.25 | <0.5 |
| | Charging | 2 h | 53.9 | <0.5 | <1 | 3.1 | 0.51 | <0.5 |
| | Charging | 3 h | 53.5 | 0.66 | 23.0 | 4.7 | 3.5 | <0.5 |
| | Brine rinse | Composite sample | 11.0 | 63.9 | 146 | 1.6 | 16.2 | 1.7 |
| | Elution | 15 min | 0.447 | 907 | 124 | 416 | 1012 | 943 |
| | Elution | 30 min | 0.516 | 3 355 | 1 466 | 209 | 132 | 227 |
| | Elution | 1 h | 0.124 | 1 195 | 1 010 | 0.86 | 0.38 | 2.2 |
| | Elution | 2 h | 0.035 | 352 | 69 | 0.34 | <0.1 | 0.35 |
| | Elution | 3 h | 0.010 | 166 | 2.4 | 0.39 | <0.1 | 0.37 |
| | Water rinse | Composite sample | 0.003 | 144 | <1 | 0.45 | <0.1 | <0.2 |
| | Regeneration | Composite sample | 0.001 | 1.4 | <1 | 0.30 | <0.1 | <0.2 |
| Resin II | Charging | Feed sample | 52.8 | 203 | 140 | 49.0 | 37.8 | 36.6 |
| | Charging | 1 h | 52.6 | <0.5 | <1 | 1.4 | <0.25 | <0.5 |
| | Charging | 2 h | 51.5 | <0.5 | <1 | 7.6 | <0.25 | <0.5 |
| | Charging | 3 h | 53.3 | <0.5 | 5.2 | 4.0 | 0.45 | <0.5 |
| | Brine rinse | Composite sample | 11.4 | 36.7 | 70.6 | 1.1 | 5.1 | 3.8 |
| | Elution | 15 min | 1.06 | 4 130 | 570 | 11.4 | 2 120 | 3 610 |
| | Elution | 30 min | 0.242 | 2 850 | 1 490 | 102 | 118 | 4.1 |
| | Elution | 1 h | 0.064 | 465 | 1 500 | 17.8 | <0.1 | <0.2 |
| | Elution | 2 h | 0.009 | 68.5 | 950 | 6.9 | <0.1 | <0.2 |
| | Elution | 3 h | 0.002 | 11.1 | 1.6 | 1.2 | <0.1 | <0.2 |
| | Water rinse | Composite sample | 0.024 | 7.4 | <1 | 0.44 | <0.1 | 0.28 |
| | Regeneration | Composite sample | 0.002 | 2.5 | <1 | 3.0 | <0.1 | <0.2 |
| Resin III | Charging | Feed sample | 52.8 | 203 | 140 | 49.0 | 37.8 | 36.6 |
| | Charging | 1 h | 35.3 | <0.5 | <1 | 1.2 | 0.25 | <0.5 |
| | Charging | 2 h | 53.0 | <0.5 | 5.5 | 3.7 | 1.1 | <0.5 |
| | Charging | 3 h | 54.7 | <0.5 | 35.7 | 2.9 | 6.7 | <0.5 |
| | Brine rinse | Composite sample | 13.1 | 31.0 | 45.8 | 1.6 | 7.7 | 0.7 |
| | Elution | 15 min | 0.813 | 410 | 73.3 | 383 | 778 | 764 |
| | Elution | 30 min | 0.931 | 2 395 | 1 620 | 133 | 135 | 165 |
| | Elution | 1 h | 0.457 | 986 | 975 | 1.0 | 0.33 | 1.1 |
| | Elution | 2 h | 0.190 | 379 | 111 | 0.51 | <0.1 | <0.2 |
| | Elution | 3 h | 0.076 | 190 | 9.5 | 0.77 | <0.1 | <0.2 |
| | Water rinse | Composite sample | 0.019 | 360 | 3.4 | 0.25 | <0.1 | <0.2 |
| | Regeneration | Composite sample | 0.010 | 4.7 | <1 | 0.40 | <0.1 | <0.2 |

Table 2 shows that all the selected resins were able to remove the impurities required. Resin II performed best, being able to produce a solution of the required purity in over two hours. The selected resins acted far better in a copper(I) chloride-sodium chloride solution than other resins that were tried, which were unable to perform selectively as desired.

EXAMPLE 2

A pilot test was carried out in glass columns with an outer diameter of 70 mm (wall thickness 4.2 mm) and a height of 1000 mm (straight section). The total volume of the column was 3 litres and 2 litres of resins were then added. The resin used in the pilot was resin II. There were two columns in series in the run and the flow occurred from the top to the bottom without intermediate pumping. In front of the columns there was a column filled with copper chips, with the purpose of reducing the copper that had oxidized during intermediate storage to monovalent copper.

At first both columns were changed once every 24 hours and eluted. Later only the first of the columns was subjected to elution, the second column was used as the first and the ready eluted column was used as the final column. The elution frequency was changed so that it depended on the amount of impurities in the feed solution, generally every 2-3 days.

In the first test campaign the concentrate used contained very little nickel and manganese and thus their amount in the ion-exchange feed solution was below the analysis limit. The zinc content in the feed solution varied between 100-900 mg/l with an average of 340 mg/l. The lead content varied between 3-70 mg/l with an average of 21 mg/l. In the product solution 80% of the zinc analyses were below the analysis limit (0.5 mg/l) as were 58% of the lead analyses (analysis limit 1 mg/l). In the analyses of the copper product reduced from copper oxidule zinc was typically below 1 ppm and lead below 0.5 ppm.

In the second test campaign a concentrate was used with a lead content of about twice that of the concentrate used in the first campaign. The contents of the impurities relevant with regard to ion exchange did not differ greatly from those of the previous campaign.

The zinc content of the feed solution varied in this campaign between 120-920 mg/l with an average of 390 mg/l. The lead content at the start of the series was 75 mg/l, rising to a level of 440 mg/l at the end of the series. Nickel was again below the analysis limit of 0.5 mg/l, and the manganese content was between 0.1-1.2 mg/l.

95% of the product solution zinc analyses were below the analysis limit (0.5 mg/l) as were 42% of the lead analyses (analysis limit 1 mg/l). The nickel and manganese contents were again very low.

In the analyses of the copper product reduced from copper oxidule zinc was on average 1.3 ppm and lead 0.55 ppm i.e. the copper product was of LME-A quality.

The invention claimed is:

1. A method for the removal of one or more metal impurities in chloride-based copper recovery processes, comprising:
contacting an aqueous strong chloride solution, having an acidic or neutral pH of at least 6 and an alkali chloride content of at least 200 g/l, and comprising monovalent copper and one or more metal impurities with a chelating ion-exchange resin under conditions that:
bind one or more metal impurities to said chelating ion-exchange resin, and
do not bind at least some of said monovalent copper to said chelating ion-exchange resin,
thereby forming:
a bound chelating ion-exchange resin, and
a metal impurity depleted aqueous strong chloride solution comprising monovalent copper;
separating said bound chelating ion-exchange resin from said metal impurity depleted aqueous strong chloride solution comprising monovalent copper;
displacing a residual metal impurity depleted aqueous strong chloride solution comprising monovalent copper from the bound chelating ion-exchange resin by contacting the bound chelating ion-exchange resin with an NaCl solution;
eluting said one or more metal impurities from the bound chelating ion-exchange resin to form an eluted chelating ion-exchange resin;
regenerating the eluted chelating ion-exchange resin by contacting it with an alkaline solution; and
displacing the alkaline solution from the chelating ion-exchange resin with an NaCl solution before contacting the chelating ion-exchange resin with an aqueous strong chloride solution comprising monovalent copper and one or more metal impurities.

2. A method for the removal of one or more metal impurities in chloride-based copper recovery processes, comprising:
contacting an aqueous strong chloride solution, having an acidic or neutral pH of at least 6 and an alkali chloride content of at least 200 g/l, and comprising monovalent copper and one or more metal impurities with a chelating ion-exchange resin under conditions that:
bind one or more metal impurities to said chelating ion-exchange resin, and
do not bind at least some of said monovalent copper to said chelating ion-exchange resin,
thereby forming:
a bound chelating ion-exchange resin, and
a metal impurity depleted aqueous strong chloride solution comprising monovalent copper;
separating said bound chelating ion-exchange resin from said metal impurity depleted aqueous strong chloride solution comprising monovalent copper; removing the majority of the one or more metal impurities in the strong chloride solution of monovalent copper by hydroxide precipitation prior to the contacting with the chelating ion-exchange resin.

3. A method according to claim 2, wherein the hydroxide precipitation removes said one or more metal impurities to a content of 0.1-1 g/l.

4. A method for the removal of one or more metal impurities in chloride-based copper recovery processes, comprising:
contacting an aqueous strong chloride solution, having an acidic or neutral pH of at least 6 and an alkali chloride content of at least 200 g/l, wherein said aqueous strong chloride solution comprises monovalent copper and one or more metal impurities and has a monovalent copper content of 30-100 g/l with a chelating ion-exchange resin under conditions that:
bind one or more metal impurities to said chelating ion-exchange resin, and
do not bind at least some of said monovalent copper to said chelating ion-exchange resin,
thereby forming:
a bound chelating ion-exchange resin, and
a metal impurity depleted aqueous strong chloride solution comprising monovalent copper; and
separating said bound chelating ion-exchange resin from said metal impurity depleted aqueous strong chloride solution comprising monovalent copper.

* * * * *